United States Patent [19]

Ueno

[11] Patent Number: 5,605,698
[45] Date of Patent: Feb. 25, 1997

[54] ORAL COMPOSITION

[75] Inventor: Gaku Ueno, Chiba-ken, Japan

[73] Assignee: Dai-Nippon Meiji Sugar Co., Ltd., Tokyo, Japan

[21] Appl. No.: 349,724

[22] Filed: Dec. 5, 1994

[30] Foreign Application Priority Data

Dec. 28, 1993 [JP] Japan .................................. 5-335186

[51] Int. Cl.$^6$ ...................................................... A61K 9/68
[52] U.S. Cl. ........................... 424/440; 424/401; 424/439
[58] Field of Search ................................. 424/401, 439, 424/440, 441; 514/909, 911

[56] References Cited

U.S. PATENT DOCUMENTS

| | | | |
|---|---|---|---|
| 3,134,716 | 5/1964 | Aspergren | 167/55 |
| 5,116,820 | 5/1992 | Hiji | 514/25 |

OTHER PUBLICATIONS

Suh, Jin Hwal; Suh, Tae Kyu (Coll. Med., Hanyang Univ., Seoul, S. Korea). Hanyang Uidae Haksulchi, 9(2), 505–18 (Korean) 1989, vol. 112:210821, 1990.

*Primary Examiner*—Thurman K. Page
*Assistant Examiner*—Sharon Howard
*Attorney, Agent, or Firm*—McAulay Fisher; Nissen Goldberg & Kiel, LLP

[57] ABSTRACT

The present invention provides auxiliary food having the effects of decreasing food intake as an external factor by suppressing the sensibility to sweetness in eating food, and the effect of decreasing a desire for eating as an internal factor by increasing the number of times of chewing.

The auxiliary food is used as chewing gum for helping diet and abstinence from drinking and preventing obesity, containing 0.3 to 130 mg of gymnemic acid as an effective ingredient.

2 Claims, No Drawings

ORAL COMPOSITION

BACKGROUND OF THE INVENTION

1. Field of the Invention

The present invention relates to an oral composition containing gymnemic acid (referred to as "GA" hereinafter), e.g. chewing gum containing GA as typical example, which is contained in an extract of *Gymnema Sylvestre* (referred to as "GS extract" hereinafer).

2. Description of the Related Art

The extract of *Gymnema Sylvestre* (GS extract) which is a perennial plant of Asclepiadaceae growing naturally in India, Southeast Asia and China has been known as having the function to suppress the sensibility to sweetness from old times. Although the physiological mechanism of the gymnemic acid (GA) contained in the GS extract is not always apparent, GA has recently attracted attention because it has the pharmacological effect of inhibiting the absorption of sugar in the human digestive system. There have been thus many proposals of use as a medicine for diabetes and as health food, and practical applications thereof. The present day is called the age of satiation and overeating, and brings about increases in the degree of obesity due to excessive caloric intake and lack of exercise, thereby causing increases in the number of diseases of adult people. There is also the problem of apositia of young women caused by excessive diet.

Although the GS extract has the effect of inhibiting sugar absorption, it has the problem of strong peculiar bitterness, and the problem of making the taste buds which is sensible to sweetness in the mouth insensible to the sweetness of sweat food due to the anesthesia thereof. There is thus no practical application in which the GS extract is contained in food for tasting sweetness. Namely, since sweetness of food is generally an important factor for a good taste, the insensibility to sweetness causes a bad taste, resulting in unwillingness to eat.

There are thus conventional proposals for providing sweet food as health food which permits a taste of sweetness in the mouth, and which is effective for preventing obesity by inhibiting absorption in the digestive system such as the intestinal tract. For example, health food of the type in which the GS extract is involved in cyclodextrin is proposed, and is actually commercially available.

In order to decrease caloric intake, efforts to decrease the intake of sugar and lipid, and to take low-calorie substitute food are extensively made. However, since it is necessary for preventing obesity and limiting caloric intake to exert the efforts at every meal every day, a strong will and power of execution are required for actually exerting the efforts, thereby causing difficulties. Such self-control rather frequently causes new frustration.

SUMMARY OF THE INVENTION

The inventors previously earnestly performed research on food by making the use of the function of the GS extract with attention to the excellent effect of suppressing sweetness.

Food generally contains protein, fat and carbohydrate as main components, and carbohydrate contains sugar as a sweet component. The amounts of the components are important factors for a good taste of food. Beer, whisky and Japanese Sake of course contain sugar which is an important factor for a good taste.

It was found in the course of the research that it is important for preventing obesity by diet to decrease the food intake and the amounts of the fat and sugar as the food components, as described above. In recent research, attention was given to the report that the number of times of chewing also affects the food intake.

The present invention has been achieved on the basis of the results of research performed by the inventors for providing the following auxiliary food. The food is capable of decreasing the degree of satisfaction of a desire for eating sweet food or increasing a feeling of avoidance from the desire by decreasing the sweetness of the food taken within a predetermined time immediately after eating the auxiliary food or making insensible to sweetness by increasing the number of times of chewing, in spite of the absence of a feeling of avoidance from strong bitterness. The auxiliary food can give the sufficient satisfaction as an external factor due to an increase in the number of times of chewing, and decrease a desire for eating food as an internal factor due to the suppression of the sensibility to sweetness. The food is useful because it is handy to carry and can appropriately be taken according to demand.

Namely, the present invention has been achieved based on the finding from test results that when the effect of decreasing food intake as an external factor by suppressing the sensibility to sweetness in eating food is combined with the effect of decreasing the desire for eating food, as the internal factor, by increasing the number of times of chewing, excellent effects which can hardly be expected from conventional food, can be obtained.

An object of the present invention is to provide an oral composition as auxiliary food which has the effect of decreasing the food intake as the external factor by suppressing the sensibility to sweetness in eating food, and the effect of decreasing the desire for eating food as the internal factor by increasing the number of times of chewing.

In order to achieve the object, there is provided an oral composition containing gymnemic acid as an effective ingredient, particularly an oral composition for helping diet, abstinence from drink or temperance or preventing obesity. The composition can be provided in typical forms such as chewing gum, a tablet cake, a granule oral refrigerant and a troche. These types of food are known as auxiliary food which is generally chewed in the mouth.

It is preferred for achieving the object of the present invention that the content of gymnemic acid in the above-described oral composition is 0.3 to 130 mg, preferably 0.7 to 15 mg, per unit amount of the composition taken at a time. The content lower than this range has little effect, and the content higher than the range increases bitterness.

The oral composition of the present invention may contain either purified GA or unpurified GS extract. The GS extract can be obtained by extraction of GS dry leaves with water or an aqueous solution containing alcohol. The unpurified GS extract represents the product obtained as about 250 g solid by a method in which an aqueous solution containing 30% ethanol is added to 1 kg of dry GS leaves at an amount ratio of 11:1, followed by extraction at 80° C. for 2 hours, the leaves are then filtered off, and the filtrate is concentrated and then powdered by spray drying. The amount of the GS extract corresponding to GA is 5 to 500 mg, preferably 10 to 60 mg, per unit amount of the oral composition taken at a time. Although GA is known as a compound having triterpene as a skeleton and gluconic acid, it is a glycoside having at least 20 homologues and a quantitative method has not been established as yet. GA is generally defined as being extracted from the GS extract precipitated at pH 3 or less, with a 30 to 70% alcohol solution. Further, in some cases instead of the GS extract, GS dry leaves finely crushed 100 mesh may be added in an amount 2 to 4 times larger than the extract.

Although the typical form of the oral composition of the present invention is chewing gum, the composition is not limited to this, and is effective as a tablet cake, a granule oral refrigerant or a troche.

When chewing gum containing GA as the auxiliary food of the present invention is chewed for 1 to 2 minutes, the sensibility to sweetness is temporarily decreased, or completely eliminated by increasing the amount of the food, thereby causing the tendency to be spontaneously temperate in eating between meals and eating, and to decrease the intake of alcohol drinks and further abstain from drinking.

The present invention is effective as auxiliary food useful for preventing obesity, for a person such as a diabetic who must diet and limit calorie, and for preventing a person of hyperphagia from overeating and eating between meals.

Although liquors such as whisky, beer and sake are high-calorie drinks, and overdrinking thereof of course causes obesity, since the intake of the oral composition prevents overdrinking of such alcoholic drinks, the oral composition is effective for preventing obesity. The oral composition is also effective for helping a person who is apt to overdrink alcohol and a person of alcohol dependence to be temperate in drinking and abstain from drinking.

DETAILED DESCRIPTION OF THE INVENTION

Although the present invention is described below with reference to examples, the present invention is not limited to the examples.

Example 1

GS dry leaves of India growth were extracted with water and a 30% alcohol solvent, and the resultant extract was dried and powdered by spray drying.

The ingredients of a chewing gum base shown in Table 1 below were charged in a kneader according to conventional procedure, and then sufficiently kneaded at about 200° C. to produce a gum base.

1.5% of GS extract dry power was mixed with each of the resultant gum base and a sugarless type gum base for diet containing no sugar of Compounding Example 2 shown in Table 1 to form a stick of gum (4 g each corresponding to the unit amount of food taken at a time).

TABLE 1

| Raw material | Compounding Example 1 | Compounding Example 2 |
| --- | --- | --- |
| Vegetable resin | 25% | |
| Vinyl acetate resin | 22 | total 30% | total 30% |
| Polyisobutylene | 8 | | |
| Ester gum | 10 | | |
| Wax | 21 | | |
| Emulsifier oil | 4 | | |
| Calcium carbonate | 10 | | |
| Powder sugar | | 45 | |
| Glucose | | 24 | |
| Spice | | 1 | 1 |
| Maltitol | | | 38 |
| Erythritol | | | 30 |
| Stevioside | | | 1 |

When seven panelists A to G (in 20's to 50's) were let to chew a stick of gum of each example for 2 minutes, they gave the same impression that the gum first tasted sweet without reluctance, but the sweet taste then decreased.

As a result of sampling of the types of food shown in Table 2 below within 30 minutes after chewing of the gum, the compressions shown in Table 2 were obtained.

TABLE 2

| Panelist | Sugared coffee | Doughnut | Milk chocolate | Short-cake |
| --- | --- | --- | --- | --- |
| A | x● | △□ | △♦ | △□ |
| B | x△ | x△ | x△ | x |
| C | ▲ | ●□ | △□ | △□ |
| D | ▲ | ●□ | △ | △ |
| E | x | ●△ | △ | ●□ |
| F | □ | ● | △ | △ |
| G | ▲● | △■ | ♦● | △□ | x: not sweet  △: only bitter
△:unsavory  ■: flavorless
●: intastable  ♦: uneatable
□: light taste The results shown in Table 2 revealed the following matters:

1. All seven panelists evaluated all foods to be unsavory, and had different tastes from ordinary states.
2. All panelists did had no sweet taste of sweet food such as coffee, doughnut, mill chocolate and shortcake, and did not want to eat such types of food. The loss of the sensibility to sweetness continued for 30 to 60 minutes.

Example 2

5% of GS extract dry powder was mixed with Compounding Example 1 shown in Table 1 in accordance with the method employed in Example 1. The gum obtained was tested by the seven panelists some days after. The compounding amount had effects on the taste of the gum. The results obtained are shown in Table 3.

TABLE 3

| Panelist | Sugared coffee | Doughnut | Milk chocolate | Short-cake |
| --- | --- | --- | --- | --- |
| A | x● | △□ | △♦ | △□ |
| B | x△ | x△ | x△ | x |
| C | ▲ | ●□ | △□ | △□ |
| D | ▲ | ●□ | △ | △ |
| E | x | ●△ | △ | ●□ |
| F | □ | ● | △ | □ |
| G | ▲● | △■ | ♦● | △□ | x: not sweet  ▲: only bitter
△:unsavory  ■: flavorless
●: intastable  ♦: uneatable
□: light taste The results shown in Table 3 reveal the following matters:

1. Many panelists evaluated the gum to have sweetness significantly suppressed as compared with Example 1, and an uneatable feeling.
2. The upper limit of the content of GS extract dry powder in chewing gum of Compounding Example 1 was estimated to 5%.

Example 3

The extract obtained by extraction of GS leaves with hot water was dried and powdered by spray drying, and 3% of the extract and 3% cyclodextrin (mixture of α, β and γ substances) were added to the gum of Compounding Example 2 shown in Table 1 and mixed therewith, followed by panel test in accordance with the method employed in Example 1. The results obtained are shown in Table 4.

TABLE 4

| Panelist | Chinese needles | Curry and rice | Pizza | Toast bread | Mix sandwiches |
|---|---|---|---|---|---|
| A | ● | Δ | Δ♦ | Δ□ | ▲● |
| B | Δ | Δ♦ | xΔ | x♦ | ▲■ |
| C | ▲ | ●□♦ | Δ | Δ□ | ▲Δ |
| D | ▲ | ●□♦ | Δ♦ | Δ♦ | ▲● | x: not sweet  ▲: only bitter
Δ: unsavory  ■: flavorless
●: intastable  ♦: uneatable
□: light taste The results shown in Table 4 reveal that although the tastes depend upon the items of meals, all panelists had tastes different from ordinary tastes, and some of them left food half-eaten.

Example 4

GS dry leaves of India growth were extracted with water and an alcohol solvent, and the extract obtained was dried and powdered by spray drying. Solid raw materials at the mixing ratios shown in Table 5 were powdered and then mixed, and liquid raw materials were then kneaded with the mixture of the solid materials to form a solid oral refrigerant in accordance with conventional procedure.

TABLE 5

| Ingredient | |
|---|---|
| Powdered Glycyrrhiza | 300 g |
| Xylitol | 70 |
| Powdered Cinnamon bark | 30 |
| Powdered ginger | 20 |
| Cloves | 10 |
| Peppermint oil | 10 |
| Lemon oil | 2 |
| Eugenol | 1 |
| GS extract | 50 |
| Cyclodextrin | 1 |
| Methyl paraoxybenzoate | suitable amount |
| Solution of gum arabic | 50 |

10 grains (about 0.2 g) of the oral refrigerant were chewed in the month, followed by taste tests of alcoholic drinks. The results obtained are shown in Table 6.

TABLE 6

| Panelist | Beer | Whisky | Japanese sake | Wine | Low-class distilled spirits |
|---|---|---|---|---|---|
| A | ●■ | Δ♦ | Δ♦ | Δ□ | ▲● |
| B | Δ■ | ●♦ | Δ■ | ♦■ | ♦■ |
| C | ▲■ | ●□♦ | Δ● | Δ□ | ●Δ |
| D | ▲■ | ●□♦ | Δ● | Δ♦ | ♦● | x: not sweet  ▲: only bitter
Δ: unsavory  ■: flavorless
●: intastable  ♦: uneatable
□: light taste The results shown in Table 6 reveal that all four panelists who usually had a taste for liquors had bad tastes of beer, Japanese sake, whisky as distilled spirits and low-class distilled spirits, and could not continuously drink such liquors.

Example 5

A troche agent was formed by using the ingredients shown in Table 7 in accordance with conventional procedure.

TABLE 7

| Ingredient | |
|---|---|
| Gum arabic | 6.0% |
| Glucose | 70 |
| GS extract | 4.5 |
| Cyclodextrin | 15 |
| Citric acid | 3 |
| Spices | 0.5 |
| Sucrose ester | 1 |

After ten adult diabetics of 46 to 65 years old were let lick the troche agent before a meal or between meals, changes in the sense of taste and the subsequent behaviors were observed. The results obtained are shown in Table 8 below.

TABLE 8

| Number of patients who did not enjoy meal | 6 |
|---|---|
| Number of patients who did not enjoy sweet cake | 9 |
| Number of patients who did not enjoy fruit | 7 |

As seen from the results, most of the patients changed in the sense of taste, and about a half, i.e., four patients, became to refrain from overeating and eating between meals.

Example 6

Tablet cakes (about 2 g) were formed by using the ingredients shown in Table 9 below in accordance with conventional procedure using a tablet machine. After panelists were let lick a tablet, a panel test was performed in accordance with the taste test performed in Example 1. As a result, all panelists had tastes different from ordinary tastes.

TABLE 9

| Ingredient | |
|---|---|
| Reduced maltose starch syrup | 65.0% |
| GS extract | 5 |
| Cyclodextrin | 15 |
| Citric acid | 1 |
| Vitamin C | 3 |
| Spices | 9 |
| Coloring | 0.7 |
| Gelatin | 0.3 |
| Sucrose ester | 0.1 |

In the present invention, chewing of the oral composition such as chewing gum or the like containing *Gymnema Sylvestre* (GS) for 1 to 2 minutes can temporarily decrease the sensibility to sweetness or completely eliminate the sensibility to sweetness by increasing the amount of the composition, thereby decreasing the amount of eating between meals, a meal or drinking. The oral composition thus has the effect of preventing overeating and overdrinking which are important causes of obesity, and the effect of enabling abstinence from drink.

In the ordinary food in the form of chewing gum, since the number of times of chewing has the effect of promoting the feeling of a full stomach as an internal factor, the oral composition of the present invention has excellent effects in combination with the effect of decreasing the appetite as an external factor.

When the appetite as the external factor is decreased by changing the sensibility to sweetness, the good taste of food is also lost, and it thus seems to be impossible from the viewpoint of cost to provide such food as to decrease the sensibility to sweetness. However, the oral composition of the present invention is used as auxiliary food such as chewing gum for changing the taste of food, not used for changing the taste of food by adding AG to food itself. Since the oral composition of the present invention can be eaten as ordinary food for any persons, and need not to be supplied as special food to some people, the oral composition has excellent applicability. Particularly, since the oral composition can be provided as means for helping diet and temperance which are generally very difficult to execute, or auxiliary food having the portable form, such as chewing gum, oral refrigerant, a troche, a table cake and so on, for a person such as a diabetic who must abstain from overeating, the oral composition has the excellent effect of permitting intake in any place other than home according to demand.

What is claimed is:

1. A method for decreasing the sensitivity of the tongue to sweetness comprising orally administering a composition in the form of a chewable gum, chewable tablet, oral refrigerant, or oral troche, said composition containing gymnemic acid in an amount effective to decrease the sensitivity of the tongue to sweetness.

2. The method of claim 1 wherein the amount of gymnemic acid is from 0.3 to 130 mg/unit dosed.

* * * * *